United States Patent
Garces

Patent Number: 5,811,949
Date of Patent: Sep. 22, 1998

[54] TURN-ON DELAY COMPENSATOR FOR MOTOR CONTROL

[75] Inventor: Luis J. Garces, Mequon, Wis.

[73] Assignee: Allen Bradley Company, LLC, Milwaukee, Wis.

[21] Appl. No.: 936,758

[22] Filed: Sep. 25, 1997

[51] Int. Cl.⁶ .............................. H02P 7/63; H02M 1/12
[52] U.S. Cl. .................... 318/448; 318/619; 318/811; 363/41
[58] Field of Search ................................. 318/445, 448, 318/599, 606, 611, 619, 624, 798–801, 807, 810, 811; 363/39, 40, 41, 55, 56, 95, 97, 98, 131, 132

[56] References Cited

U.S. PATENT DOCUMENTS

| 4,272,715 | 6/1981 | Matsumoto | 318/800 |
|---|---|---|---|
| 4,686,437 | 8/1987 | Langley et al. | 318/254 |
| 4,763,057 | 8/1988 | Danz et al. | 318/809 |
| 4,800,478 | 1/1989 | Takahashi | 318/812 X |
| 5,038,092 | 8/1991 | Asano et al. | 318/811 |
| 5,231,339 | 7/1993 | Kishimoto et al. | 318/807 |
| 5,450,306 | 9/1995 | Garces et al. | 363/41 |
| 5,559,419 | 9/1996 | Jansen et al. | 318/808 |
| 5,646,499 | 7/1997 | Doyama et al. | 318/801 |

Primary Examiner—Bentsu Ro
Attorney, Agent, or Firm—Michael A. Jaskolski; John M. Miller; John J. Horn

[57] ABSTRACT

A method and apparatus for essentially eliminating turn-on delay distortions in terminal voltages and currents in a three phase motor control system wherein a compensator provides correction voltages which are added to command voltages as a function of feedback current amplitudes. Also a method for calibrating an open loop turn-on delay compensator during a commissioning procedure using a closed loop current controller.

26 Claims, 10 Drawing Sheets

TURN-ON DELAY COMPENSATOR FOR MOTOR CONTROL

BACKGROUND OF THE INVENTION

The present invention relates to motor controllers and more particularly to a method and an apparatus for dead time compensation in motor controls.

One type of commonly designed motor is a three phase motor having three Y-connected stator windings. In this type of motor, each stator winding is connected to an AC voltage source by a separate supply line, the source providing time varying voltages across the stator windings. Often, an adjustable speed drive (ASD) will be positioned between the voltage source and the motor to control motor speed by controlling the stator voltages and frequency.

Many ASD configurations include a pulse width modulated (PWM) inverter consisting of a plurality of switching devices. Referring to FIG. 1, an exemplary PWM inverter leg 10 corresponding to one of three motor phases includes two series connected switches 12, 13 between positive and negative DC rails 18, 19 and two diodes 16, 17, a separate diode in inverse parallel relationship with each switch 12, 13. By turning the switches 12, 13 ON and OFF in a repetitive sequence, leg 10 receives DC voltage via rails 18 and 19 and provides high frequency voltage pulses to a motor terminal 22 connected to a stator winding 24. By firing the switching devices in a regulated sequence the PWM inverter can be used to control the amplitude, phase and frequency of voltage that is eventually provided across windings 24.

Referring to FIG. 2, an exemplary sequence of high frequency voltage pulses 26 that an inverter might provide to a motor terminal can be observed along with an exemplary low frequency alternating fundamental voltage 28 and related alternating current 30. By varying the widths of the positive portions 32 of each high frequency pulse relative to the widths of the negative portions 34 over a series of high frequency voltage pulses 26, a changing average voltage which alternates sinusoidally can be generated. The changing average voltage defines the low frequency alternating voltage 28 that drives the motor. The low frequency alternating voltage 28 in turn produces a low frequency alternating current 30 that lags the voltage by a phase angle $\Phi$.

The hardware which provides the firing pulses to the PWM inverter is typically referred to as a PWM signal generator. Referring to FIG. 3(a), illustrative waveforms used by a signal generator to generate the firing pulses for leg 10 may be observed. As well known in the art, a carrier waveform 36 is perfectly periodic and operates at what is known as the carrier frequency. A command voltage waveform 38 is sinusoidal, having a much greater period than the carrier waveform 36.

Referring also to FIGS. 3(b) and 3(c), an ideal upper signal 40 and an ideal lower signal 42 that control the upper and lower switches 12, 13, respectively, can be observed. The turn-on $t_{u1}$, $t_{u2}$ and turn-off $t_{o1}$, $t_{o2}$ times of the upper and lower signals 40, 42 come from the intersections of the command waveform 38 and the carrier waveform 36.

When the command waveform 38 intersects the carrier waveform 36 while the carrier waveform has a positive slope, the upper signal 40 goes OFF and lower signal 42 goes ON. On the other hand, when the command waveform 38 intersects the carrier waveform 36 while the carrier waveform has a negative slope, the upper signal 40 goes ON and the lower signal 42 goes OFF. Thus, by comparing the carrier waveform 36 to the command waveform 38, the state of the upper and lower signals 40, 42 can be determined. The upper and lower signals 40, 42 are provided to the delay module 11.

Referring also to FIGS. 2 and 3(d), an ideal high frequency voltage pulse 26 resulting from the ideal upper and lower signals 40, 42 in FIGS. 3(b) and 3(c) that might be provided at terminal 22 can be observed. When the upper signal 40 is ON and the lower signal 42 is OFF, switch 12 allows current to flow from the high voltage rail 18 to motor terminal 22 thus producing the positive phase 44 of pulse 26 at motor terminal 22. Ideally, when the upper signal 40 goes OFF and the lower signal 42 goes ON, switch 12 immediately turns OFF and switch 13 immediately turns ON connecting motor terminal 22 and the low voltage rail 19 producing the negative phase 46 of pulse 26 at terminal 22. Thus, the ideal high frequency voltage pulse 26 is positive when the upper signal 40 is ON and is negative when the lower signal 42 is ON.

While advanced digital electronic signal generators can produce the desired high frequency signals to turn inverter components ON and OFF, the inverter components cannot turn ON and OFF instantaneously. Ideally, when one switch 12 turns on, the series switch 13 turns OFF, and vice versa.

In reality, however, each switch 12, 13 has turn-on and turn-off times that vary depending on the technology used for their construction. Thus, while signals to turn the upper switch 12 ON and the lower switch 13 OFF might be given at the same instant, the lower switch 13 may go OFF slower than its command leading to a condition where both switches are conducting thus providing an instantaneous DC short between a high DC rail 18 and a low DC rail 19. Such a DC short can cause irreparable damage to both the inverter and motor components.

To ensure that the series switches of an inverter are never simultaneously on, a delay module is typically provided to introduce a turn-on delay between the times when one switch turns off and the other switch turns on. The delay module modifies the upper and lower signals 40, 42 by adding a turn-on delay period $\gamma$ prior to the turn-on times $t_{u1}$, $t_{u2}$ of each of the upper and lower signals 40, 42. Referring to FIGS. 3(e) and 3(f), the delay periods $\gamma$ produce delayed and shortened upper and lower signals 40' and 42' having delayed turn-on times $t_{u1}'$, $t_{u2}'$.

Referring to FIG. 3(g), while the delay periods $\gamma$ protect the motor and inverter components, they produce voltage deviations $\zeta_n$ at the motor terminal 22 that produce distorted positive and negative phases 48, 50 and a distorted high frequency voltage pulse 52. These deviations $\zeta_n$ can best be understood by referring to FIGS. 1, 2, and 3(e)–3(g).

Referring to FIGS. 1, 2 and 3(e)–3(g), while the terminal current 30 at motor terminal 22 might be positive (i.e. flowing from the source into the load), the high frequency voltage pulses 26 will be oscillating from positive to negative phase as the delayed upper and lower signals 40', 42' turn the switches 12, 13 ON and OFF. Thus, while the terminal current 30 is positive, two signal states may occur. First, the upper signal 40 may be OFF while the lower signal 42 is ON and second the upper signal 40 may be ON while the lower signal 42 is OFF. Likewise, when the current 69 is negative, the same two signal states may exist.

When the terminal current is positive and switch 12 is ON while switch 13 is OFF, the high voltage rail 18 is connected to motor terminal 22. Diode 17 blocks the flow of current to the low voltage rail 19. When the upper switch 12 turns OFF at $t_{o1}$, both series switches 12, 13 remain OFF during the delay period $\gamma$. As well known in the art, motor winding 24 operates as an inductor at terminal 22. Because of motor winding inductance, current 30 caused by voltage 28 cannot change directions immediately to become negative each time the high frequency voltage pulse 26 changes from the positive 32 to the negative 34 phase. The current remains positive and diode 17 immediately begins to conduct at $t_{o1}$ connecting the low voltage rail 19 to terminal 22 as desired. Hence, the terminal voltage goes negative at the desired time $t_{o1}$ even though the turn-on time $t_{u2}$ of the delayed lower signal 42' does not occur until after the delay period γ.

On the other hand, when switch 12 is initially OFF and diode 17 is ON and the terminal current 30 is positive, the low voltage rail 19 is connected through diode 17 to terminal 22 as desired and the resulting terminal voltage pulse 52 is in the negative phase 50. When switch 13 turns OFF at $t_{o2}$, as the positive terminal current 30 cannot immediately reverse itself, diode 17 continues conducting and low voltage rail 19 remains connected to terminal 22 for the duration of delay period γ. Thus, during the delay period γ, instead of having positive phase voltage at terminal 22 as desired, the negative phase 50 of the resulting terminal voltage pulse is extended until the turn-on time $t_{u1}$' of delayed upper signal 72' that turns ON switch 12.

Comparing FIGS. 3(d) and 3(g), the resulting terminal voltage pulses 52 have wider negative phases 50 and narrower positive phases 48 than the ideal voltage pulses 26. A voltage deviation $\zeta_n$ occurs each time the lower switch 13 is turned OFF and the terminal current 30 is positive. As well known in the art a similar type of deviation $\zeta_n$ of opposite polarity is produced when the terminal current 30 is negative and the upper switch 12 turns from ON to OFF.

While each individual deviation $\zeta_n$ does not appreciably affect the instantaneous value of alternating voltage, accumulated deviations do distort the low fundamental frequency alternating voltage 28 and resulting current 30 thereby causing undesirable torque pulsations. Referring to FIG. 4a, an ideal terminal voltage 28 and associated current 30, and an actual terminal voltage 54 generated without compensating for turn-on delay periods are illustrated. While the ideal voltage 28 and current 30 are purely sinusoidal, the actual voltage 54 is distorted by the $\zeta_n$ deviations.

Generally, two types of controllers, open loop and closed loop current regulating, are used to correct for turn-on delay errors. A closed loop current regulating controller includes one or more feedback loops which provide feedback signals for comparison to command signals. Typically either command current or voltage is compared to a feedback current or voltage, respectively.

Based on the comparison, the controller alters PWM operation to eliminate the difference between the command and feedback voltages thereby driving the motor as desired. While closed loop controllers work well, they are typically complex and accordingly expensive, making them unsuitable for many inexpensive control operations.

An open loop controller which facilitates turn-on delay compensation is based on the assumption that the errors between command voltages and actual terminal voltages can be predetermined and that the controller can instantaneously alter the polarity of a correction voltage to compensate for the assumed error. To this end, during positive terminal current periods, generally, turn-on delays reduce the actual voltage amplitude from the ideal amplitude by a value ΔV which can be expresses as:

$$\Delta V = \zeta_n * V_{dc} * f_{PWM} \qquad \text{Eq. 1}$$

where $V_{dc}$ is the DC voltage and $f_{PWM}$ is the carrier frequency of the PWM inverter. Similarly, during negative terminal current periods the actual voltage amplitude is generally increased from the ideal amplitude by ΔV.

To compensate for terminal voltage deviations related to turn-on delays, referring to FIGS. 4a and 4b, because terminal voltage deviations are periodic, a periodic correction voltage 69 can be added to the command signal prior to comparison to the carrier signal. During positive current periods, because turn-on delays generally reduce the output voltage by ΔV, by adding a correction voltage 69 equal to voltage ΔV to the command signal, the deviation should be compensated. Similarly, during negative current periods, because turn-on delays generally increase the output voltage by ΔV, by subtracting a correction voltage 69 equal to voltage ΔV from the command signal, the deviation should be compensated. Thus, the correction signal 69 is positive and equal to ΔV when current 30 is positive and is negative and equal to ΔV when current 30 is negative.

To implement this type of compensation, typically current sensors are provided which determine when a terminal current 30 crosses zero. Each time the current 30 crosses zero the correction voltage 69 is changed from positive to negative or vice versa, depending on the change in current 30 (i.e. when current 30 goes from negative to positive, correction voltage 69 goes positive and when current 30 goes from positive to negative, correction voltage 69 goes negative).

While an ideal open loop solution works quite well to compensate for turn-on delay errors, open loop systems also have some shortcomings. Determination of current polarity requires very fast and extremely accurate current sensors as well as an extremely fast controller to provide immediate polarity reversal of the correction voltage. Such sensors and fast controller hardware are expensive. In addition, where a microprocessor based controller is used, external comparators and fast interrupts are required to reverse compensation polarity when the current passes through zero. In any case, if the controller is too slow and provides a lagging correction voltage, output distortions not fully compensated can lead to changes in the motor power factor and to instability in motor speed control. If the controller provides correction voltage prior to the required time, current passes through the zero level steeply and can cause speed cogging and torque oscillations which can in turn cause motor oscillation if the torque oscillations coincide with mechanical system resonances.

In addition, through experimentation it has been recognized that the square wave correction voltage 69 (see FIG. 4b) is not ideal for correcting terminal voltage 54. In fact, it has been determined that square wave correction voltages cause terminal current distortions.

The open loop control problems can be best understood by observing waveforms associated with such a system. Waveforms generated using an open loop controller are illustrated in FIG. 5. FIG. 5 curves were generated using a PWM inverter including IGBT's having switching frequencies between 2 and 10 KHz. The PWM frequency was set to 10 KHz with a turn-on delay of 4 microseconds. The fundamental frequency of the command voltages was 0.5 Hz. The top curve illustrates a single phase feedback motor current $i_a$, the middle curve illustrates an uncompensated and desired command voltage $V_a^*$ and the lower curve illustrates a compensated command voltage $V_a^{**}$ compensated by adding a square wave to the uncompensated command voltage solely as a function of the sign of a feedback current $i_a$.

Distortions at zero crossings of current $i_a$ due to addition of the square wave correction voltage are easily observable as well as the effects of current zero crossing in the other two phases (i.e. $i_b$ and $i_c$ which are not illustrated) due to the fact that the phase currents effect each other (i.e. $i_a+i_b+i_c=0$). In other words, there are three equispaced distortions during each half cycle of current $i_a$ which correspond to zero crossings of current $i_a$, $i_b$ and $i_c$, respectively.

The inability of inexpensive open loop controllers to accurately compensate for turn-on delays has limited the use of these controllers to operation above a couple of Hertz fundamental frequency and to operation within a relatively low PWM frequency range (e.g. two to four KHz). Where high performance is required, relatively expensive closed loop current regulating controllers have been used instead of less expensive open loop controllers.

Thus, it would be advantageous to have an inexpensive open loop control system which can accurately compensate for turn-on delay distortion in terminal voltages without causing terminal current distortion.

BRIEF SUMMARY OF THE INVENTION

The present invention includes an open loop controller having a compensator which alters command voltages by adding correction voltages to the command voltages which essentially eliminate terminal voltage turn-on delay distortion. To this end, the compensator receives feedback currents and provides correction voltages not only as a function of the sign of the feedback current, but also as a function of current amplitude when the current is close to a zero amplitude.

While the theoretical correction voltage is a precise square wave (see FIG. 4b), PWM inverter switches cannot facilitate immediate correction voltage polarity reversal when fired. The turn ON and turn OFF times of the power devices are a function of the device currents and the transitions are not the instantaneous events described, but rather linear and "smooth" taking a finite amount of time. In other words, the square wave correction voltage cannot be precisely implemented with open loop PWM hardware and switching limitations generate terminal current distortion (see FIG. 5). In addition, as indicated above, it has been recognized that even a perfectly timed square wave causes terminal current distortion.

According to the present invention, to compensate for PWM switch limitations and current distortion due to square wave correction voltages, the square wave correction voltage is modified. To this end, it has been found that errors due to switching limitations and square wave compensation can essentially be compensated by modifying the correction voltage during a current zero crossing period wherein the zero crossing period is a period during which a feedback current is near zero. Generally, when the feedback current is negative and not within a current zero crossing period, the correction voltage is set equal to a negative threshold voltage. Similarly, when the feedback current is positive and not within a current zero crossing period, the correction voltage is set equal to a positive threshold voltage. The positive threshold voltage is determined according to Equation 1 and the negative threshold voltage is the negative of the positive threshold. During current zero crossing periods the correction voltage is modified. Specifically, during zero crossing periods, the correction voltage is linearly related to the feedback current by a gain K factor.

To determine an ideal gain K for a specific PWM inverter, the inverter is driven by a closed loop current regulating vector controller with a variable gain compensator during a commissioning procedure. The controller uses two different mechanisms to generate sinusoidal terminal currents.

First, the compensator provides a correction voltage which is a function of gain K. If gain K is ideal, the correction voltage generates distortion-free sinusoidal terminal current. However, any error in K generates a correction voltage which in and of itself would cause distorted non-sinusoidal terminal currents.

Second, to the extent that the variable gain compensator distorts terminal currents, the closed loop controller regulates a d-axis command voltage as a function of the feedback current to eliminate the current distortion. When gain K is ideal and alone provides sinusoidal terminal currents, the d-axis command voltage is essentially a distortion free DC signal. However, when gain K is not ideal and does not provide sinusoidal terminal currents, the d-axis command voltage is regulated and varies from its steady state value.

During commissioning, with the drive running at constant speed and in current regulation, the d-axis voltage is monitored while gain K is altered until d-axis voltage distortion is minimized. Once d-axis voltage distortion is minimized gain K is stored as a compensator gain for use during post-commissioning motor operation.

One object of the invention is to provide an open loop controller which compensates for turn-on delay errors without causing current distortion.

Another object is to compensate for turn-on delay errors inexpensively. The present invention does not require precise current sensors or an extremely fast processor and does not require a current regulator. The inventive controller can operate with less precise current regulators because zero crossing precision is less important than with prior art controllers. This is because, during the zero crossing period which is just before and just after the zero crossing point correction voltage is tied to the current amplitude and therefore has less effect on the modified command voltage. Thus, the effect of current zero crossing inaccuracy is substantially reduced.

Yet another object of the invention is to provide a system which can be tuned to alter the correction voltage to account for varying switch characteristics. Even PWM switches of the same kind can have slightly different switching characteristics and therefore, a tunable compensator which can be tuned to account for varying characteristics is desirable. By changing the gain K associated with each leg of an inverter, each leg can be tuned to account for different switching characteristics. Moreover, given a specific PWM inverter, the switching error is also dependent on PWM operating frequency. Thus, tunability is also desired to adjust compensator operation as a function of PWM frequency.

In one aspect, compensator gain K is automatically alterable as a function of PWM frequency and feedback current.

One other object is to provide a system which provides optimum performance at many different frequencies. Often one inverter will be driven at different PWM operating frequencies at different times. Gain K is frequency dependent and therefore must be changed each time PWM frequency is altered. In these cases it would be tedious to have to manually step through the commissioning procedure each time the operating frequency is altered.

To facilitate automatic gain changes, different gains K for each PWM frequency can be derived and correlated with the gains K. The correlated frequencies and gains K are then stored in a memory unit accessible during post-commissioning controller operation.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

A. Configuration

1. Post-Commissioning Open Loop

Figure 1:
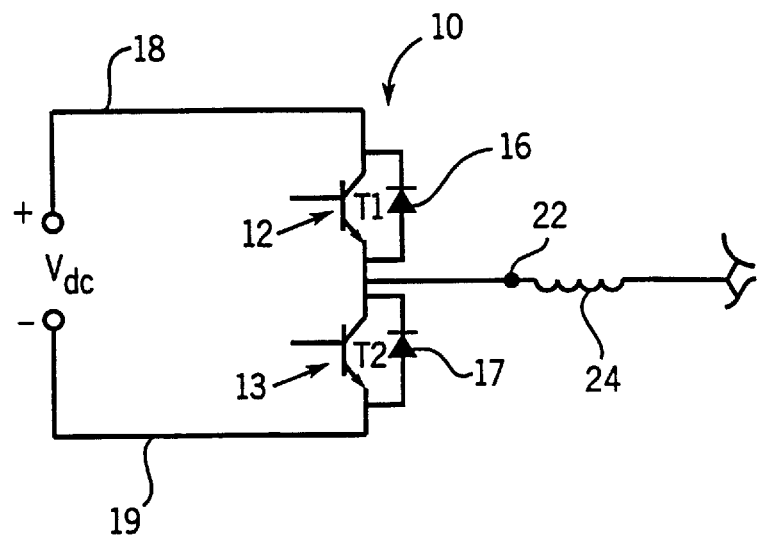
FIG. 1 is a schematic of a single leg of a three phase PWM inverter.

In the description that follows, an "*" superscript denotes a command signal, an "f" subscript denotes a feedback signal, "a", "b" and "c" subscripts denote signals corresponding to the three phases of a motor and associated controller, a "TH" subscript denotes a threshold value, a "lim" subscript denotes a limit value, an "'" superscript denotes a modified signal and a "cor" subscript denotes a correction voltage.

Referring now to the drawings, wherein like reference characters represent corresponding elements throughout the several views, and more specifically referring to FIG. 6, the present invention will be described in the context of an exemplary motor control system 100 which includes a plurality of components that receive a command frequency signal f* and generates supply voltages on three separate lines 102, 104 and 106 to drive a motor 108. System 100 includes a command signal modulator 112, a PWM generator 114, a PWM inverter 116, a two-to-three phase current converter 118 and a compensator 120.

Figure 2:
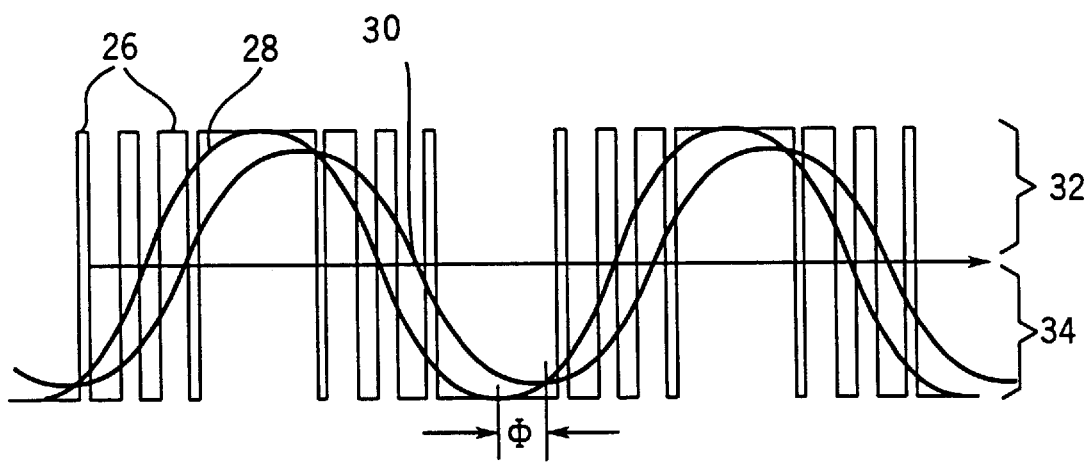
FIG. 2 is a graph illustrating a high frequency pulse train applied to a stator winding and resulting low frequency alternating voltage and current.
Figure 3A:
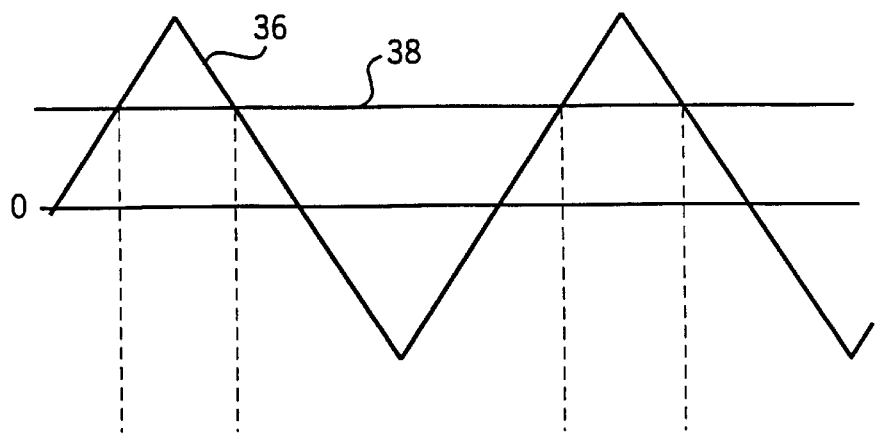
FIG. 3a is a graph illustrating the waveforms used by a PWM inverter to produce the high frequency pulses shown in FIG. 2.
Figure 3B:
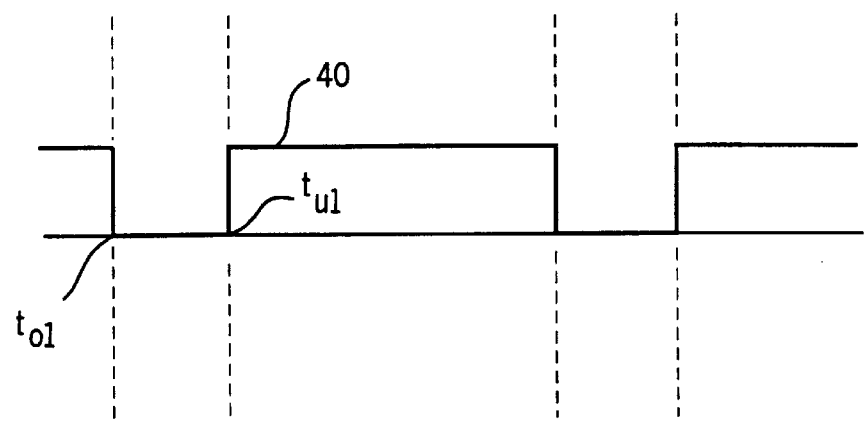
FIGS. 3b, 3c, 3e, and 3f are graphs illustrating PWM firing pulses.
Figure 3C:
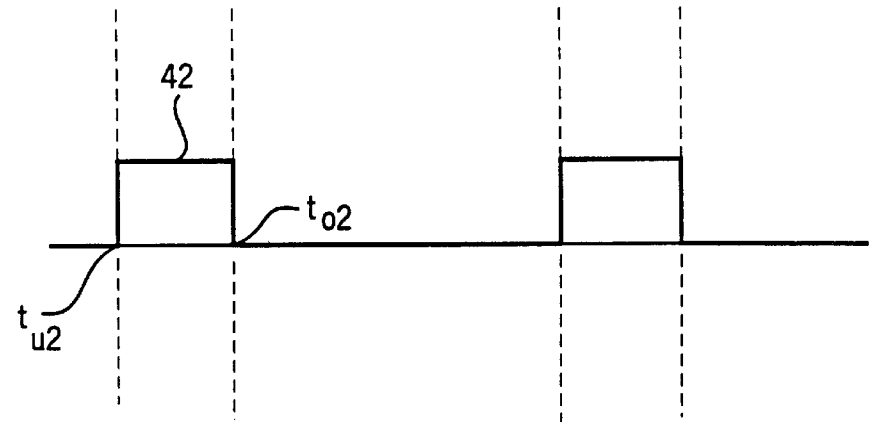
Figure 3D:
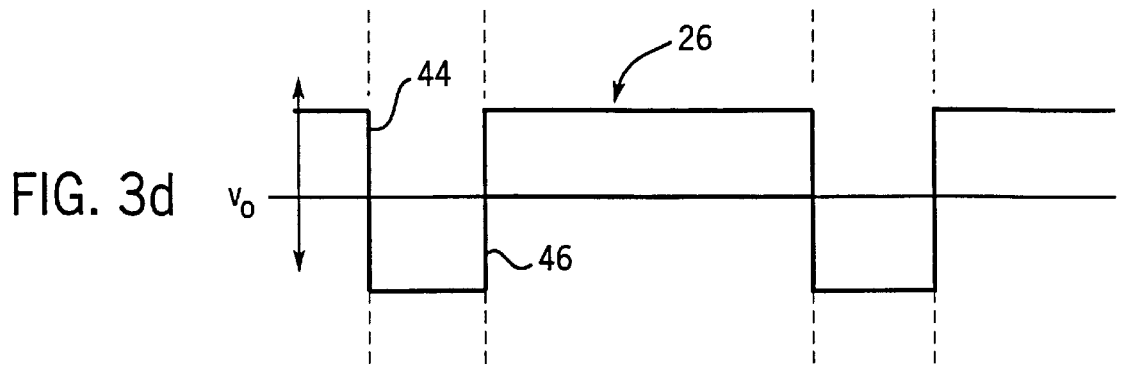
FIGS. 3d and 3g are graphs illustrating high frequency pulses delivered to a motor terminal.
Figure 3E:
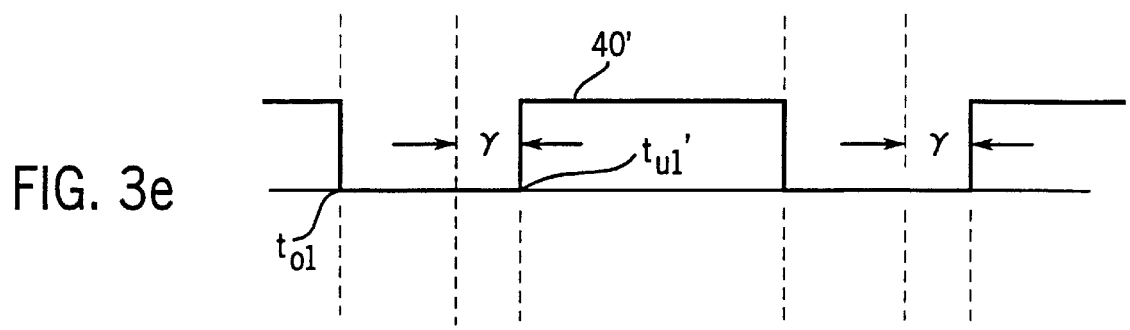
Figure 3F:
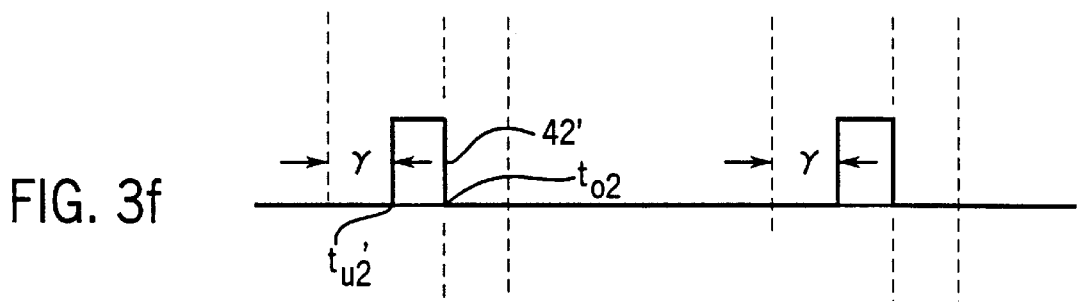
Figure 3G:
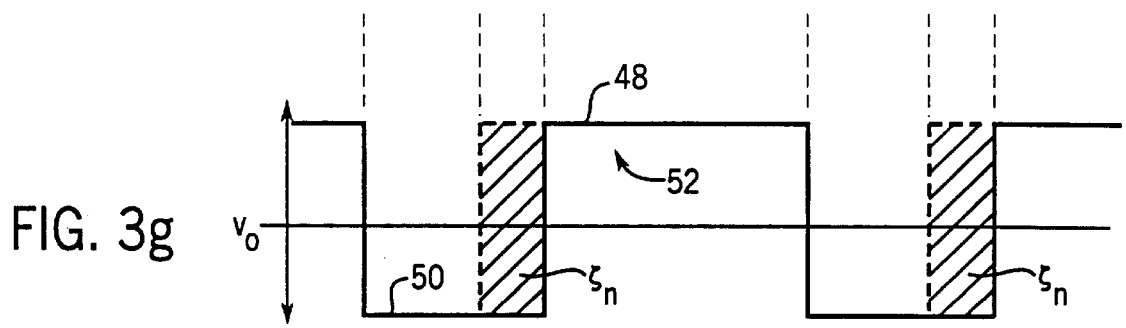
Figure 4A:
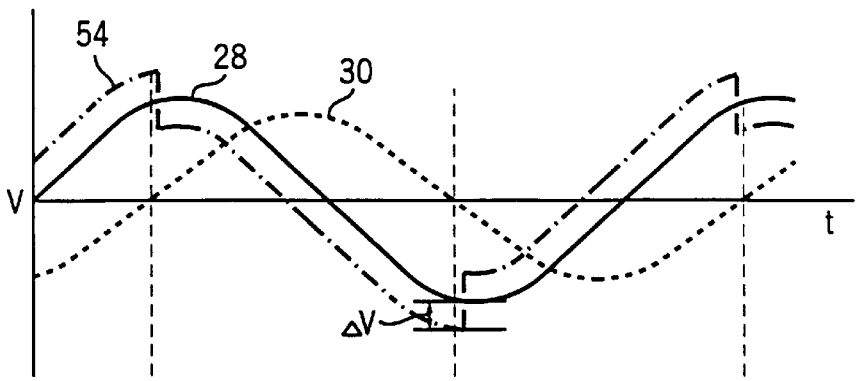
FIG. 4a is a graph illustrating ideal stator voltage and current and actual stator voltage prior to delay compensation and FIG. 4b is a graph illustrating a square wave turn-on delay correction voltage.
Figure 4B:
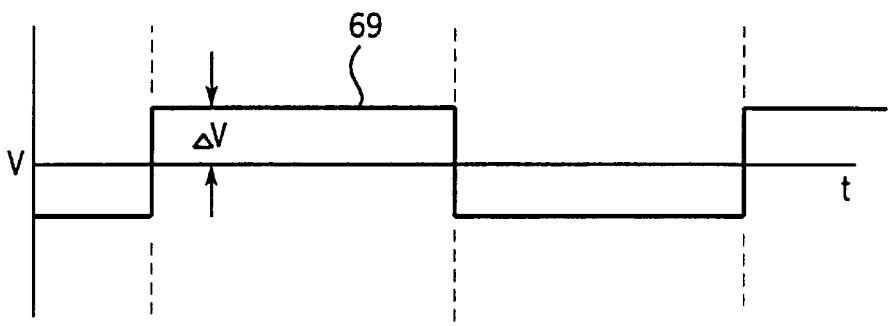

Inverter 116 includes a group of switching elements which are turned on and off to convert a DC voltage into three separate pulse trains of constant magnitude, a separate pulse train on each of supply lines 102, 104 and 106. Each pulse train is characterized by a first set of bipolar pulses of constant magnitude and variable pulse width, with their positive parts longer than their negative parts, followed by a second set of bipolar pulses of constant magnitude and variable width with their negative parts longer than their positive parts. The RMS value of the pulse train pattern approximates one cycle of a sinusoidal "AC" waveform (see FIG. 2). The pattern is repeated to generate additional cycles of the AC waveform on each of supply lines 102, 104 and 106. To control the frequency and magnitude of the AC waveforms provided to motor 108, control signals are applied to inverter 116.

The control signals to drive inverter 116 are provided by PWM generator 114. Generator 114 receives three modified command signals $V_a^{*'}$, $V_b^{*'}$ and $V_c^{*'}$ and compares each of the modified command signals with a triangle carrier signal which is at a PWM frequency $f_{PWM}$, the PWM frequency being much higher than any of the frequencies of the modified command signals. When a modified signal is greater than the carrier signal, a corresponding control signal provided to inverter 116 is high. When a modified signal is less than the carrier signal, a corresponding control signal to inverter 116 is low.

Modulator 112 is a simple Volts/Hertz modulator which can take any form well known in the art. For the purposes of this explanation it should suffice to say that modulator 112 receives command frequency signal f* and uses signal f* to generate three sinusoidal command signals $V_a^*$, $V_b^*$ and $V_c^*$ calculated to drive motor 108 at command frequency f*.

Two current sensors 119 and 121 (e.g. isolated shunts or Hall effect sensors) are arranged so as to sense the currents following through lines 104 and 106. Sensors 119 and 121 provide current feedback signals $i_{bf}$ and $i_{cf}$ to current converter 118. Current converter 118 derives third current feedback signal $i_{af}$ from signals $i_{bf}$ and $i_{cf}$ and provides all three feedback signals $i_{af}$, $i_{bf}$ and $i_{cf}$ to compensator 120.

Compensator 120 receives feedback signals $i_{af}$, $i_{bf}$ and $i_{cf}$ and command signals $V_a^*$, $V_b^*$ and $V_c^*$ and modifies the command signals $V_a^*$, $V_b^*$ and $V_c^*$ by adding three correction voltages thereby generating modified command signals $V_a^{*'}$, $V_b^{*'}$ and $V_c^{*'}$ to drive generator 114. The correction voltages added to command voltages $V_a^*$, $V_b^*$ and $V_c^*$ compensate for turn-on delay errors. Compensator 120 includes a memory unit 122, three multipliers 124, 126, 128, three comparators 130, 132, 134 and three summers 136, 138 and 140.

The compensator multipliers, comparators and summers are arranged into three separate legs, a first leg including multiplier 124, comparator 130 and summer 136, a second leg including multiplier 126, comparator 132 and summer 138, and a third including multiplier 128, comparator 134 and summer 140. Each leg of comparator 120 operates in an identical fashion (albeit phase shifted) and therefore, only the first leg consisting of multiplier 124, comparator 130 and summer 136 will be explained here in detail. The first leg receives feedback signal $i_{af}$ and, based on the amplitude of feedback signal $i_{af}$ generates a correction voltage used to modify command signal $V_a^*$. To this end, signal $i_{af}$ is provided to multiplier 124. Multiplier 124 also receives a gain K from unit 122 via a bus 142. Multiplier 124 multiplies gain K by signal $i_{af}$ and provides a gain adjusted signal $Ki_{af}$ on line 144.

Figure 7:
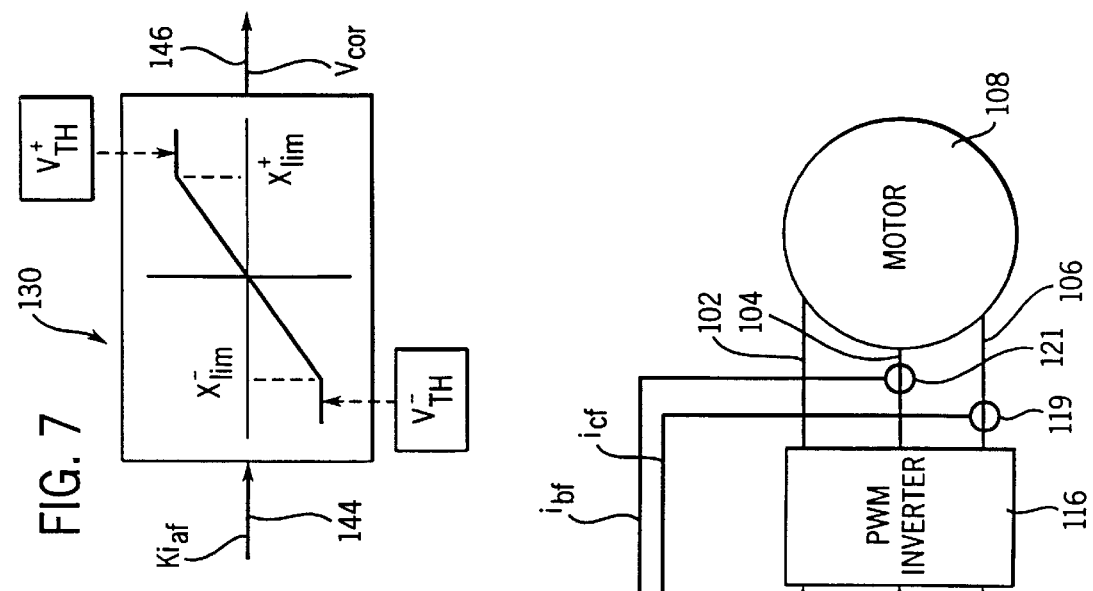
FIG. 7 is a schematic diagram of a comparator of FIG. 6.

Referring also to FIG. 7, comparator 130 receives gain adjusted signal $Ki_{af}$ and determines the magnitude of a correction voltage $V_{cor}$ therefrom. To this end, comparator 130 is also provided with a positive threshold voltage $V_{TH}^+$ and a negative threshold voltage $V_{TH}^-$ which are determined according to Equation 1. The positive threshold voltage $V_{TH}^+$ represents the maximum value of correction voltage $V_{cor}$ while the negative threshold voltage $V_{TH}^-$ represents the minimum value of the correction voltage $V_{cor}$.

Comparator 130 is also programmed with positive and negative limit values $X_{lim}^-$ and $X_{lim}^+$. When gain adjusted signal $Ki_{af}$ is greater than the positive limit value $X_{lim}^+$, correction voltage $V_{cor}$ is set equal to maximum threshold voltage $V_{TH}^+$. Similarly, when gain adjusted signal $Ki_{af}$ is less than the negative limit value $X_{lim}^-$, correction voltage $V_{cor}$ is set equal to minimum threshold voltage $V_{TH}^-$. When gain adjusted signal $Ki_{af}$ is less than or equal to positive limit value $X_{lim}^+$ and is greater than or equal to negative limit value $X_{lim}^-$, the correction voltage $V_{cor}$ is linearly related to signal $Ki_{af}$ (i.e. is linearly related to feedback current $i_{af}$). Thus, three equations which represent the relationship between correction voltage $V_{cor}$ and gain adjusted signal $Ki_{af}$ are:

$$V_{cor} = V_{TH} \cdot \frac{Ki_{af}}{X_{lim}} \quad \text{for } |Ki_{af}| \leq X_{lim} \qquad \text{Eq. 2}$$

$$V_{cor} = |V_{TH}^+| \quad \text{for } Ki_{af} > X_{lim} \qquad \text{Eq. 3}$$

$$V_{cor} = |V_{TH}^-| \quad \text{for } Ki_{af} < X_{lim}^- \qquad \text{Eq. 4}$$

Correction voltage $V_{cor}$, is provided to summer 136 via line 146. Summer 136 adds correction voltage $V_{cor}$ to command voltage $V_a^*$ thereby providing modified command voltage $V_a^{*'}$ to drive generator 114.

2. Commissioning Closed Loop Current Regulator

Figure 8:
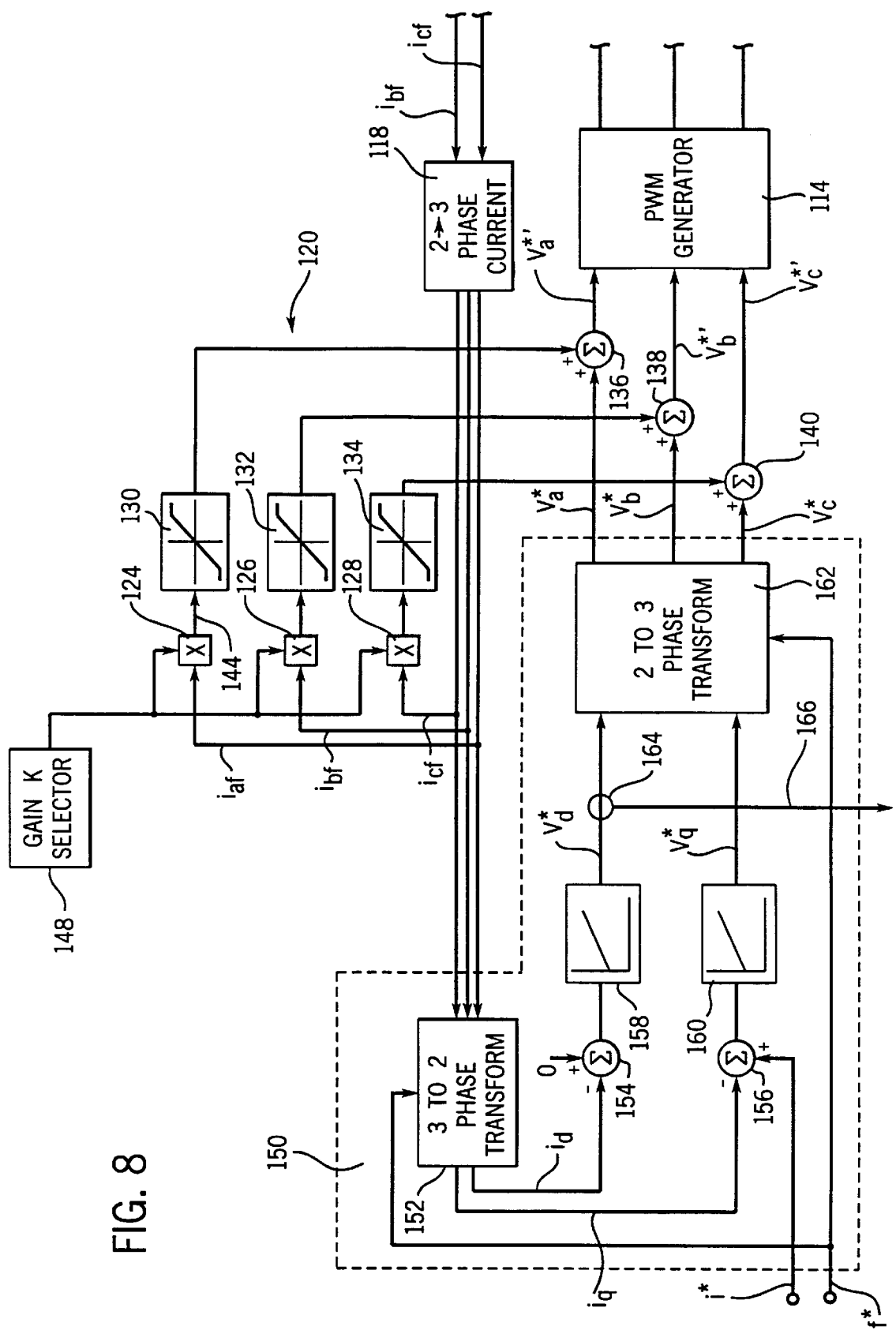
FIG. 8 is a schematic diagram of a closed loop controller used during a commissioning procedure according to the present invention.

Referring now to FIG. 8, a closed loop current regulating commissioning configuration which is used to determine compensator gain K for use during open loop operation is illustrated. While this closed loop configuration including current regulating capability is relatively more expensive than the open loop configuration described above, the closed loop configuration need only be used once per open loop configuration during a single commissioning procedure to derive gain K values for an open loop configuration. This means that a single closed loop configuration can be used to derive gain K values for a theoretically infinite number of open loop configuration. In addition, while a customer may have its own closed loop configuration for commissioning, a manufacturer can perform the commissioning procedure using a single closed loop configuration and pre-program gain K values for each unique open loop configuration prior to sale and shipping thereby reducing overall system costs.

The closed loop configuration is similar to the open loop configuration (see FIG. 6) in many respects. The primary differences between the closed and open loop configurations are that memory unit 122 is replaced by a gain K selector 148 and the command signal modulator 112 is replaced by a synchronous two phase close loop current regulating controller 150. Generator 114, converter 118, multipliers 124, 126 and 128, comparators 130, 132 and 134 and summers 136, 138 and 140 are all identical and operate like the components described above with respect to the open loop system.

Controller 150 receives a frequency command signal $f^*$, a command current signal $i^*$ and feedback currents $i_{af}, i_{bf}$ and $i_{cf}$ and uses those signals to generate command voltage signals $V_a^*, V_b^*$ and $V_c^*$ which are provided to summers 136, 138 and 140, respectively. In function, controller 150 is different than modulator 112 in that controller 150 provides current regulation causing terminal currents to be sinusoidal and essentially distortion free. Thus, controller 150 adjusts command voltages $V_a^*, V_b^*$ and $V_c^*$ such that any current distortion caused by adding correction voltages to command voltages $V_a^*, V_b^*$ and $V_c^*$ is eliminated.

Controller 150 includes a three-to-two phase transformer 152, first and second summers 154, 156, d and q-axis command voltage calculators 158, 160, a two-to-three phase transformer 162 and a voltage sensor 164.

Transformer 152 receives feedback current signals $i_{af}, i_{bf}$ and $i_{cf}$ and command frequency signal $f^*$ and uses those signals to generate synchronous two phase d and q-axis current signals $i_d$ and $i_q$. Three-to-two phase transformation is well known in the art and therefore is not explained here in detail. Q-axis current signal $i_q$ is provided to summer 156 where it is subtracted from command current signal $i^*$. The output of summer 156 is provided to calculator 160 which correlates the output with an appropriate q-axis command voltage $V_q^*$.

D-axis current $i_d$ is provided to summer 154 where it is negated. Output of summer 154 is provided to calculator 158 which correlates the output with a desired d-axis command voltage $V_d^*$. Command voltages $V_d^*$ and $V_q^*$ are provided to transformer 162 which transforms the d and q-axis voltages to three phase command voltages $V_a^*, V_b^*$ and $V_c^*$. This two-to-three phase transformation is well known in the art and therefore will not be explained here in detail. Command voltages $V_a^*, V_b^*$ and $V_c^*$ are provided to summers 136, 138 and 140.

Sensor 164 provides a signal indicative of command voltage $V_d^*$ on an output line 166. Line 166 is connected to an observation screen (e.g. a CRT) so that command voltage $V_d^*$ can be observed by an operator during commissioning.

B. Theory

Figure 5:
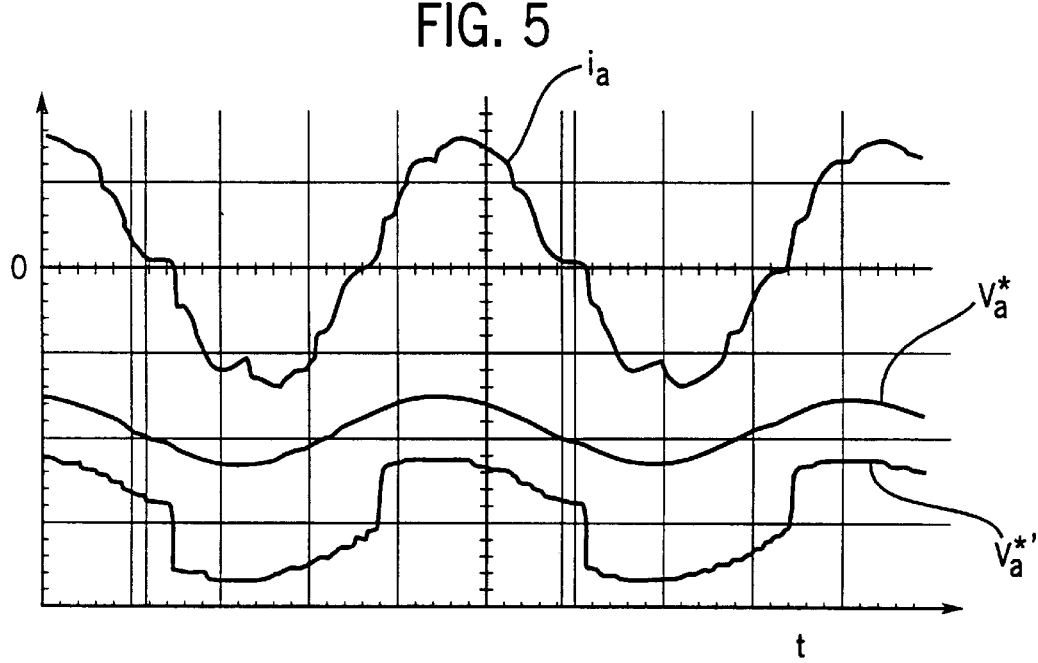
FIG. 5 is a graph showing a terminal current, an associated command voltage and an associated modified command voltage modified by adding a square wave correction voltage to the command voltage.

Referring to FIG. 5, the waveforms illustrated were generated using an open loop controller capable of providing only square wave correction voltages. In this case, every time current $i_a$ crosses zero, correction voltage polarity is altered resulting in modified command signal $V_a^{*'}$. As expected modified signal $V_a^{*'}$ has vertical step-like changes each time current $i_a$ crosses zero. Clearly the open loop configuration generates distortion in current $i_a$ each time current $i_a$ crosses zero and also each time other phase currents $i_a$ and $i_c$ (not illustrated) cross zero.

Referring to FIG. 8, the closed loop configuration can be used to determine the nature of ideal correction voltages. To this end, when compensator 120 is provided with an incorrect gain K, correction voltages in and of themselves will distort terminal currents (see FIG. 5). However, in this case, controller 150 modifies d-axis command voltage $V_d^*$ to compensate for compensator generated errors thereby providing sinusoidal terminal current. Because d-axis command voltage $V_d^*$ is the signal used to compensate for terminal current distortion, d-axis command voltage $V_d^*$ is a clear indicator of how accurately the compensator compensates for turn-on delay errors and therefore can be used to identify ideal gain K values. In other words, when gain K is ideal, compensator 128 alone will eliminate current distortion and voltage $V_d^*$ will be constant.

Figure 9:
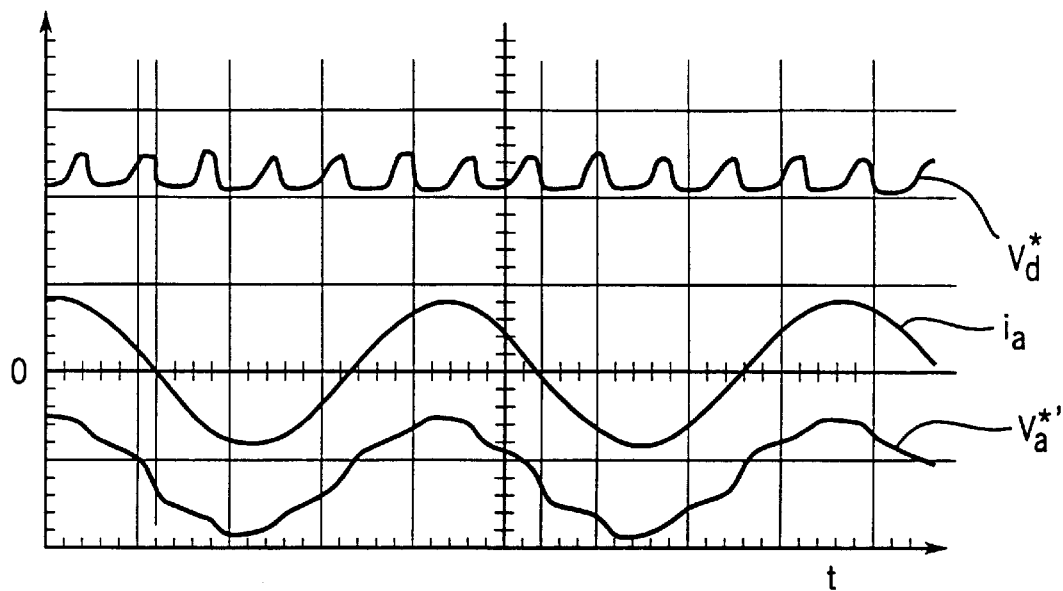
FIG. 9 is a graph showing a d-axis command voltage, a terminal current and a modified command voltage generated using a closed loop controller.

Referring now to FIG. 9, waveforms generated using the commissioning configuration of FIG. 8 wherein compensator 120 provides zero compensation voltage are illustrated. To provide zero compensation voltage, gain selector 148 is adjusted so that gain K is zero. With zero compensation voltage, controller 150 operates alone to provide command voltages $V_a^{*'}$, $V_b^{*'}$ and $V_c^{*'}$ which generate sinusoidal currents. In FIG. 9, a first waveform corresponds to d-axis command voltage $V_d^*$, a second waveform corresponds to terminal current $i_a$, and a third waveform corresponds to a modified command voltage $V_a^{*'}$.

In operation, with a zero gain K and constant command frequency $f^*$ and current $i^*$, controller 150 drives generator 114 which in turn drives motor 108. Feedback signals $i_{bf}$ and $i_{cf}$ are provided to converter 118 which derives signal $i_{af}$ and provides all three signals $i_{af}$, $i_{bf}$ and $i_{cf}$ to transformer 152. Transformer 152 receives the command frequency signal $f^*$ and the feedback signals and transforms the feedback signals into d and q-axis currents $i_d$ and $i_q$, respectively. When any one of the feedback currents $i_{af}$, $i_{bf}$ or $i_{cf}$ is not sinusoidal, the d-axis axis command voltage $V_d^*$ is modified to instantaneously compensate for current distortion generating command voltages $V_a^*$, $V_b^*$ and $V_c^*$. Because gain K is zero, summers 136, 138 and 140 add zero correction voltages to command voltages $V_a^*$, $V_b^*$ and $V_c^*$ providing modified voltages $V_a^{*'}$, $V_b^{*'}$ and $V_c^{*'}$.

Referring again to FIG. 9, it can be seen that voltage $V_d^*$ is modified each time terminal current $i_a$ crosses zero. In addition, voltage $V_d^*$ is similarly modified each time one of the other two phase currents $i_b$ or $i_c$ crosses zero. The resulting terminal current $i_a$ (and currents $i_b$ and $i_c$ for that matter) are sinusoidal.

According to the prior art methods and apparatus which add rigid square wave correction voltages to command voltages $V_a^*$, $V_b^*$ and $V_c^*$ to compensate for turn-on delays, the d and q-axis command voltages $V_d^*$ and $V_q^*$ should generate modified command voltages $V_a^{*'}$ which have rigid sharp square wave edges (see $V_a^{*'}$ in FIG. 5) each time an associated phase current $i_a$ crosses zero. However, the command voltage $V_a^{*'}$ in FIG. 9 has rather rounded edges, not square edges.

Figure 10:
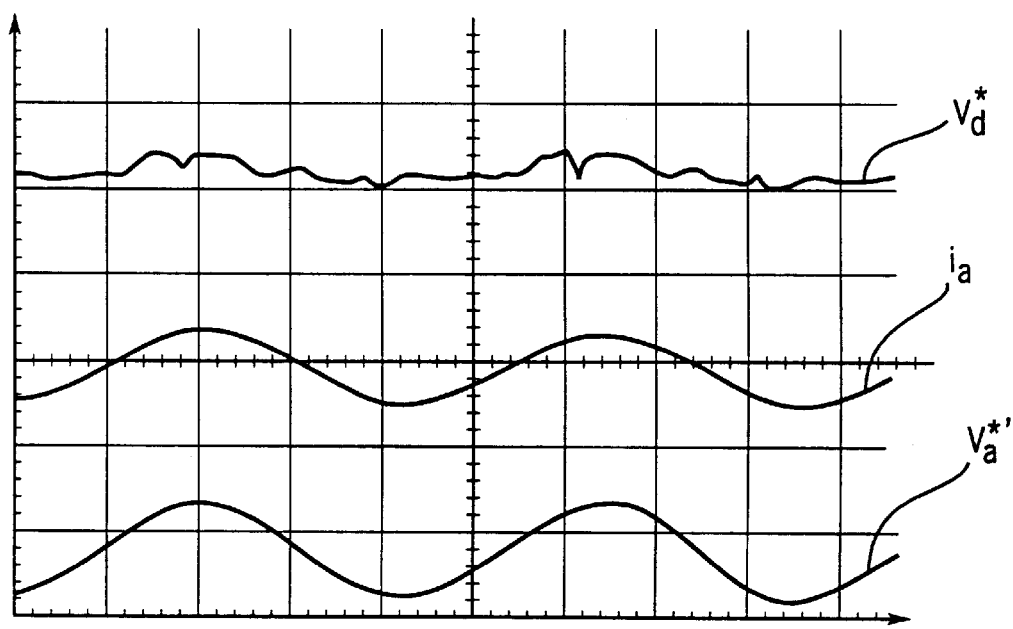
FIG. 10 is a graph similar to the graph of FIG. 9, albeit corresponding to a reduced terminal current.

Referring now to FIG. 10, the waveforms in FIG. 10, like FIG. 9, correspond to d-axis command voltage $V_d^*$, terminal current $i_a$ and modified command voltage $V_a^{*'}$ which were generated with a zero gain K value and a similar command frequency $f^*$. However, the waveforms of FIG. 10 were generated using a relatively lower command current $i^*$. In this case, modified command voltage $V_a^{*'}$ is almost purely sinusoidal and shows no sign of a sharp square waves.

Figure 11:
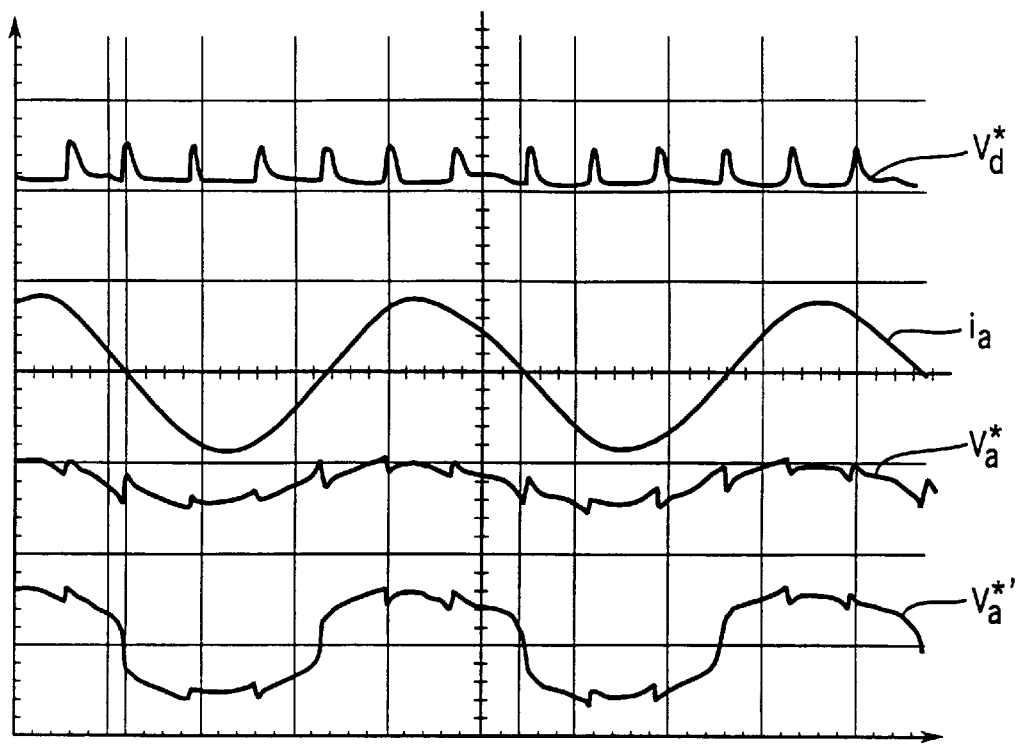
FIG. 11 is a graph showing waveforms generated using a current regulator and a square wave correction voltage compensator, the waveforms including a d-axis command voltage, a terminal current, a command voltage and a modified command voltage.

Referring once again to FIG. 8, square wave correction voltages of the prior art can be simulated using the commissioning configuration by providing a high gain K value. With constant command frequency $f^*$ and current $i^*$, controller 150 corrects for terminal current distortion by modifying command voltages $V_d^*$ and $V_q^*$. Referring also to FIG. 11, waveforms generated using high gain K are illustrated and include d-axis command voltage $V_d^*$, terminal current $i_a$, command voltage $V_a^*$ and modified command voltage $V_a^{*'}$.

According to the methods and apparatuses which provide square wave correction voltages, the addition of square waves (i.e. where gain K is relatively high) should eliminate d-axis command voltage $V_d^*$ distortion. In other words, if square wave correction voltages generate distortion free terminal currents, controller 150 will not have to alter voltage $V_d^*$ to correct for current distortions.

However, as seen in FIG. 11, despite square wave correction voltages there is still significant distortion in d-axis command voltage $V_d^*$. More interesting is that controller 150 generates command voltage $V_a^*$ such that when the square wave correction voltage is added to the command voltage $V_a^*$, the command voltage $V_a^*$ compensates and minimizes the sharp edges generating a modified command voltage $V_a^{*'}$ which once again has rather rounded edges at every zero crossing.

Figure 12:
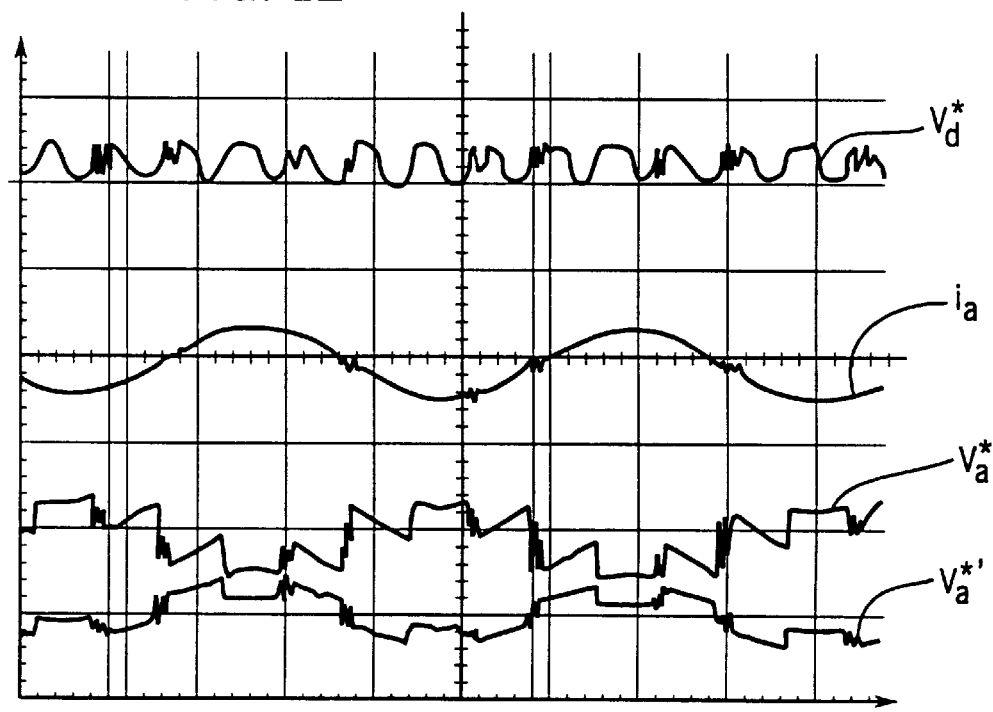
FIG. 12 is similar to FIG. 11, albeit corresponding to a reduced terminal current.

Referring also to FIG. 12, the waveforms therein, like the waveforms of FIG. 11, were generated with relatively high gain K and include d-axis command voltage $V_d^*$, terminal current $i_a$, command voltage $V_a^*$ and modified command voltage $V_a^{*'}$. The waveforms of FIG. 12 are different that those of FIG. 11 in that they were generated using a lower command current $i^*$. Clearly, when the command current $i^*$ is relatively small, the compensator and controller have difficulties discriminating the sign of the phase current and therefore d-axis command current $V_d^*$ is more distorted. In addition, by adding the correction voltage to command voltage $V_a^*$, controller 150 is forced to work relatively harder to eliminate distortion in terminal current $i_a$.

Comparing waveforms of FIGS. 9 through 12, we reach the conclusion that the correction voltage which should be added to the command voltage $V_a^*$ should not change abruptly with the sign of the current. The rounded nature of modified voltages $V_a^{*'}$ in each of FIGS. 9 through 12 indicates that the correction voltage should change polarity more gradually. In addition, comparing the waveforms of FIGS. 9 through 12 also indicates that the desired correction voltage depends on terminal current $i_a$ amplitude. When the amplitude is relatively low, correction voltage polarity should change more gradually than when the amplitude is relatively high. Thus, there is a zone of transition (a zero crossing period) near the point where the current changes sign where the correction voltage should be essentially proportional to the terminal current $i_a$ amplitude.

According to the present invention, the added correction voltage is determined by multiplying the feedback terminal current by gain K during zero crossing periods and, outside the zero crossing periods, clamping the correction voltage $V_{cor}$ to the threshold voltage levels previously added as square waves and determined according to Equation 1.

Referring now to FIGS. 8 and is, by increasing gain K starting from zero (no turn on delay compensation), the amplitude of disturbances in d-axis command voltage $V_d^*$ is significantly reduced. D-axis command voltage $V_d^*$ disturbances reach a minimum at some nominal gain K and then start to increase again reaching a level of distortion at high values of K which is identical to the distortion when pure square waves are used to compensate.

C. Tuning Gain K

Referring again to FIG. 8, with a constant command frequency signal $f^*$, a constant command current signal $i^*$ and a known PWM frequency $f_{PWM}$, selector 148 is used to adjust gain K until d-axis command voltage distortion is minimized. When d-axis command voltage distortion is minimized, controller 150 has very little effect on terminal current $i_a$. Instead, compensator 120 generates correction voltages provided to summers 136, 138 and 140 which result in essentially sinusoidal and distortion free terminal currents as desired.

Figure 13:
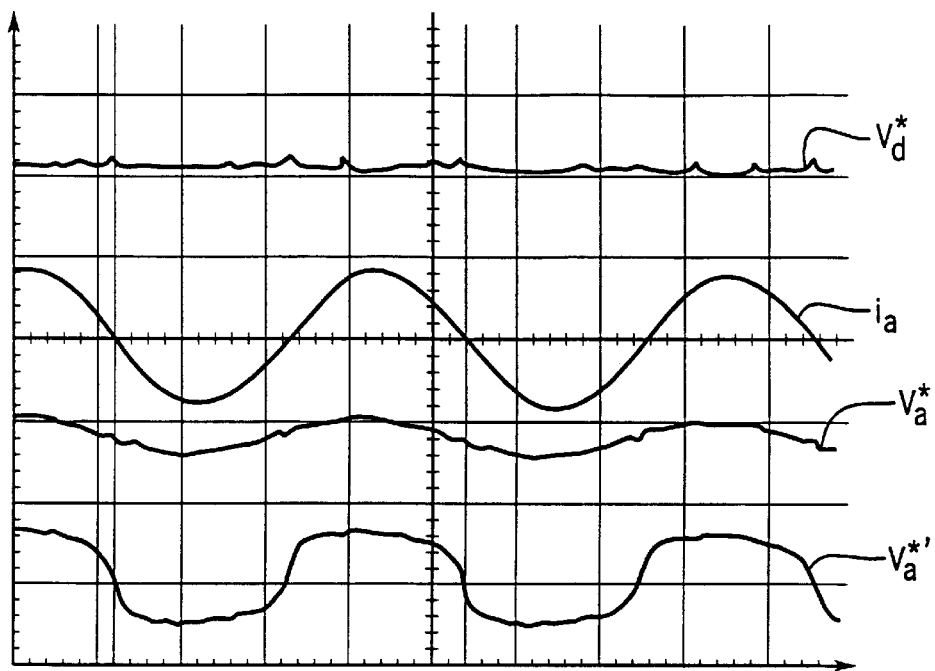
FIG. 13 is similar to FIG. 11 albeit generated using an inventive compensator.

Referring also to FIG. 13, waveforms generated using the commissioning configuration with a tuned gain K such that the command voltage $V_d^*$ has minimal distortion are illustrated. The waveforms include a d-axis command voltage $V_d^*$, terminal current $i_a$, command voltage $V_a^*$ and modified command voltage $V_a^{*'}$. It can be seen that the terminal current $i_a$ is essentially sinusoidal as is command voltage $V_a^*$. D-axis command voltage $V_d^*$ has very little distortion. As expected, modified command voltage $V_a^{*'}$ has relatively rounded edges when terminal current $i_a$ crosses through a zero level.

Figure 14:
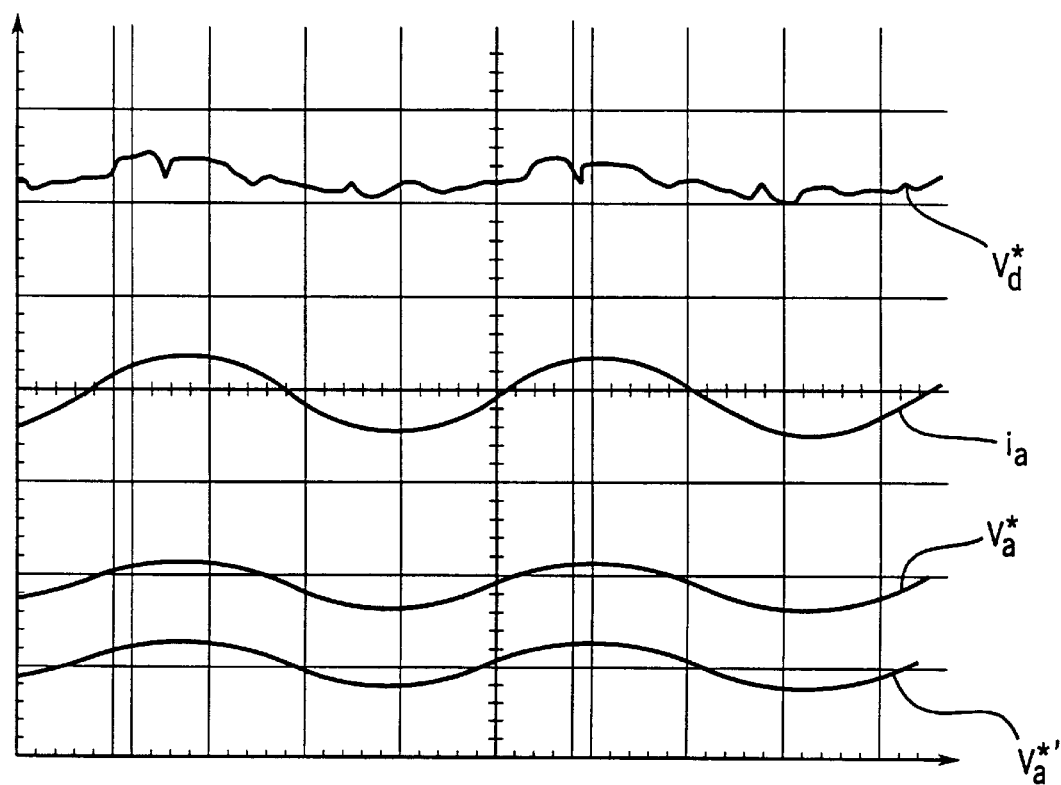
FIG. 14 is similar to FIG. 12 albeit generated using an inventive compensator.
Figure 15:
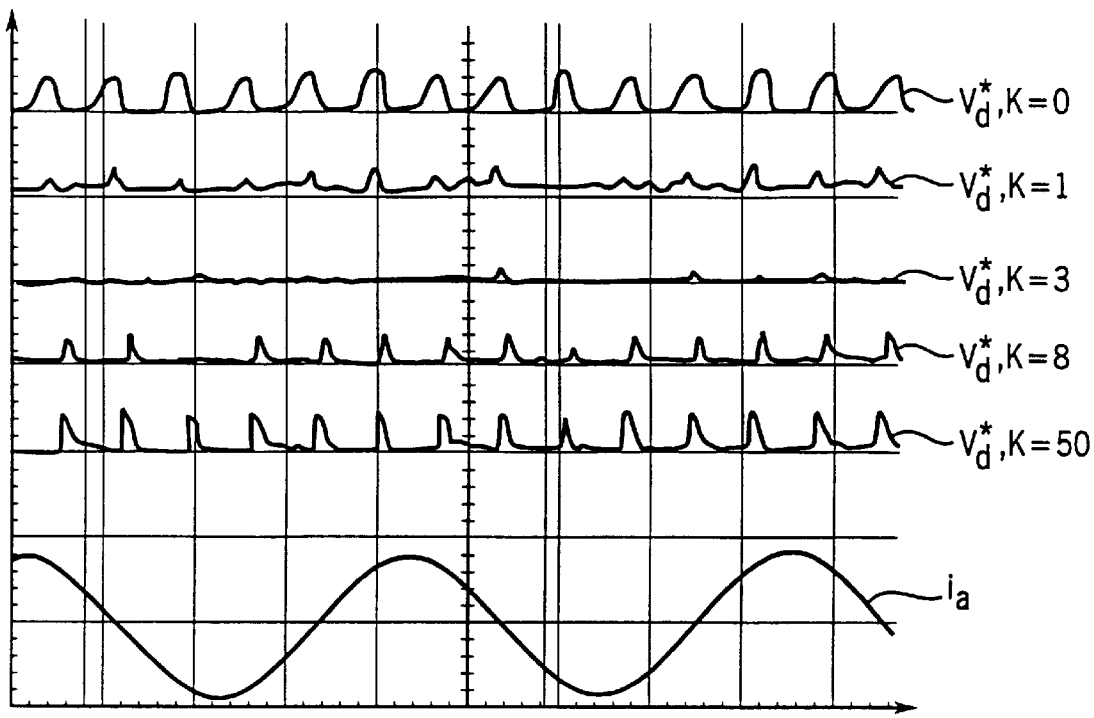
FIG. 15 is a graph illustrating d-axis command voltages with different compensator gains K and also illustrates a terminal current.

Referring also to FIG. 14, the waveforms therein are similar to the waveforms in FIG. 13 except that they were derived with a lower terminal current $i_a$. As can be seen, command voltage $V_a^*$ before addition of the correction voltage has become almost a perfect sinusoid with only slight deviations at very low current. Remaining d-axis voltage $V_d^*$ distortion is attributed to variations between the phases in the delays between the commanded signals and resulting voltages at PWM inverter switches.

With gain K having been determined for a specific PWM frequency $f_{PWM}$, frequency $f_{PWM}$ is correlated with gain K and the correlated values are stored in memory unit 122 for use during normal motor operation.

The method described above for determining gain K is used to provide a table of gain K values which is accessed to determine an optimum gain K value as a function of PWM frequency $f_{PWM}$. Using the commissioning configuration of FIG. 8, various PWM frequencies $f_{PWM}$ are used to drive the PWM inverter (not illustrated) and controller 150. For each frequency $f_{PWM}$, selector 148 is used to tune gain K until the d-axis command voltage $V_d^*$ has minimal distortion. When command voltage $V_d^*$ has minimal distortion, gain K is again correlated with PWM frequency $f_{PWM}$ and stored in memory unit 122 forming a gain K table.

D. Operation

Figure 6:
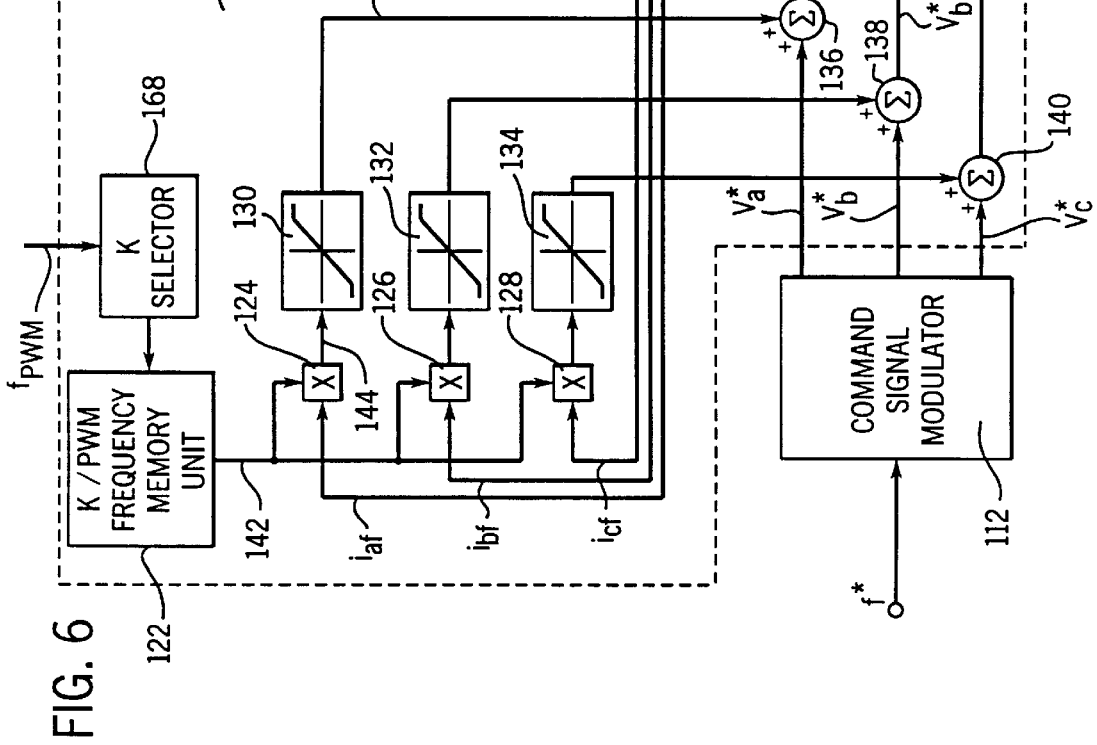
FIG. 6 is a schematic diagram of an open loop controller according to the present invention.

Referring now to FIG. 6, in operation using the open loop configuration, command frequency $f^*$ is provided to modulator 112 which provides command voltages $V_a^*$, $V_b^*$ and $V_c^*$. Correction voltages are added to command voltages $V_a^*$, $V_b^*$ and $V_c^*$ at summers 136, 138 and 140 and modified command voltages $V_a^{*'}$, $V_b^{*'}$ and $V_c^{*'}$ are provided to generator 114 to drive inverter 116 to thereby drive motor 108.

Currents $i_{bf}$ and $i_{cf}$ are sensed and provided to converter 118 which derives current $i_{af}$ and provides all three feedback currents $i_{af}$, $i_{bf}$ and $i_{cf}$ to multipliers 124, 126 and 128.

In addition, frequency signal $f_{PWM}$ is also provided to a gain K selector 168. K selector 168 uses frequency signals $f_{PWM}$ to access unit 122 and identify a desire gain K. Gain K is provided to multiplier 124 via bus 142. Similarly, gain K for multipliers 126 and 128 are also provided via bus 142 to multipliers 126 and 128 and comparators 132 and 134 which together provide correction voltages to summers 138 and 140.

Figure 16:
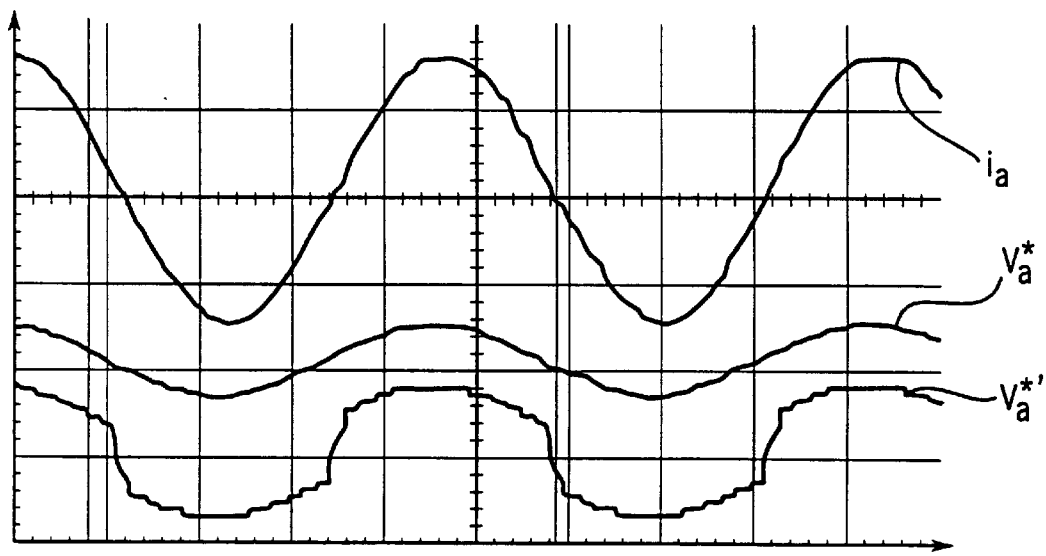
FIG. 16 is a graph generated using a open loop controller having a compensator tuned according to the present invention, with a reduced current amplitude.

Referring now to FIG. 16, waveforms generated with the open loop configuration illustrated in FIG. 6 and a tuned gain K are illustrated. The waveforms include a terminal current $i_a$, a command voltage $V_a^*$ and a modified command voltage $V_a^{*'}$. As can be seen, terminal current $i_a$ is only slightly distorted at zero crossings and the resulting modified command voltage $V_a^{*'}$, after the correction voltage has been added, has the same shape as the modified command voltage $V_a^{*'}$ under current regulation using relatively expensive controller 150 (see $V_a^{*'}$ in FIG. 13).

It should be understood that the methods and apparatuses described above are only exemplary and do not limit the scope of the invention, and that various modifications could be made by those skilled in the art that would fall under the scope of the invention. For example, while the slope of correction voltages between the threshold values has been described as linearly related to current amplitude, the slope could in fact be some other function of current amplitude which is nearly linear.

In addition, while the invention is described above in the context of an inexpensive V/Hz drive, clearly the invention could also be used to provide deadtime compensation in high performance servo-type drives. This is especially true in cases where servo drives have to operate at low current levels, which is standard for drives with current control operating permanent magnet synchronous motors. In these cases there is no magnetizing current $i_d$ so that the total current is torque producing component $i_q$. In these cases current crosses zero almost constantly instead of twice per period as in induction motors. Therefore, permanent magnet drives have serious problems detecting the zero crossings under no load or light load conditions. Here, the invention reduces disturbances by reducing compensation effects when the motor current is at or a near zero level.

Moreover, while the invention is described above as including a single gain K value for all three multipliers 124, 126, and 128, the invention also contemplates commissioning and control wherein separate and distinct gain K values are derived for each multiplier 124, 126 and 128. As discussed above, in addition to being PWM frequency dependent, gain K is also dependent on switching characteristics (i.e. on switch characteristics). While switches of the same design will typically have similar switching characteristics, they may be slightly different.

Therefore, to precisely compensate for different switching characteristics in each inverter legs, during the commissioning procedure with a constant PWM frequency $f_{PWM}$, K values for each inverter leg can be adjusted separately via selector 148 until disturbances in voltage $V_d^*$ are minimized. Then, gains $K_1$, $K_2$ and $K_3$, corresponding to the first, second and third inverter legs, are correlated and stored with frequency $f_{PWM}$ in unit 122. Other $K_1$, $K_2$ and $K_3$ values are derived using other PWM frequencies $f_{PWM}$, are correlated with frequencies $f_{PWM}$ and stored forming a gain K table.

Then, during normal motor operation (see FIG. 6), selectors 168 receives frequency $f_{PWM}$ and selects gains $K_1$, $K_2$ and $K_3$ accordingly, supplying those gains to multipliers 124, 126, and 128 for dead time compensation.

To apprise the public of the scope of this invention, I make the following claims:

I claim:

1. An apparatus to be used with a PWM generator which receives first, second and third command voltages from a PWM controller and uses the command voltages to generate first second and third associated terminal voltages at, and first, second and third currents through, motor terminals, the apparatus for substantially eliminating turn-on delay distortions in the terminal voltages and associated currents by modifying the command voltages, the apparatus comprising:

first, second and third current sensors for sensing the first, second and third terminal currents, respectively, and providing first, second and third amplitude signals indicating the amplitudes of the first, second and third currents;

first, second and third comparators for comparing the first, second and third amplitude signals to upper and lower limit values which define a range, the first comparator altering the first command voltage as a function of the first amplitude signal when the first amplitude signal is within the range, the second comparator altering the second command voltage as a function of the second amplitude signal when the second amplitude signal is within the range and the third comparator altering the third command voltage as a function of the third amplitude signal when the third amplitude signal is within the range.

2. The apparatus of claim 1 wherein the first, second and third comparators alter the first, second and third command voltage by mathematically combining first, second and third correction voltages and the first, second and third command voltages, respectively.

3. The apparatus of claim 2 wherein the first, second and third comparators mathematically combine by adding the first, second and third command voltages and the first, second and third correction voltages, respectively.

4. The apparatus of claim 3 wherein the apparatus is also used with a PWM inverter which is controlled by the generator to provide the terminal voltages, the generator operates at a PWM frequency, the generator introduces dead times into terminal voltages, the inverter includes a DC bus having a constant DC value, each of the upper and lower limit values corresponds to an upper or lower correction voltage threshold value and the upper and lower threshold values are determined by mathematically combining the PWM frequency, the dead time and the DC bus value.

5. The apparatus of claim 4 wherein the upper threshold value is determined by multiplying the PWM frequency, the dead time and the DC bus value and the lower threshold value is the negative of the upper threshold value.

6. The apparatus of claim 5 wherein, when the first amplitude signal is greater than the upper limit value, the first comparator sets the first correction voltage equal to the upper threshold value and when the first amplitude signal is less than the lower threshold value the first comparator sets the first correction voltage equal to the lower threshold value, when the second amplitude signal is greater than the upper limit value, the second comparator sets the second correction voltage equal to the upper threshold value and when the second amplitude signal is less than the lower threshold value the second comparator sets the second correction voltage equal to the lower threshold value and when the third amplitude signal is greater than the upper limit value, the third comparator sets the third correction voltage equal to the upper threshold value and when the third amplitude signal is less than the lower threshold value the third comparator sets the third correction voltage equal to the lower threshold value.

7. The apparatus of claim 3 further including first, second and third multipliers having first, second and third gains, the first, second and third multipliers receiving the first, second and third amplitude signals, respectively, modifying the amplitude signals as a function of the gains and providing the modified amplitude signals as the amplitude signals to the first, second and third comparators, respectively.

8. The apparatus of claim 7 wherein the first, second and third gains are variable and controllable.

9. The apparatus of claim 8 wherein the each of the first, second and third multipliers modifies by multiplying the first, second and third gains by the first, second and third amplitude signals, respectively.

10. The apparatus of claim 9 further including a memory unit and a processor which can access the unit, the gains are dependent on the generator frequency and the amplitude signals, a plurality of gains are correlated with different generator frequencies and amplitude signals and stored in the memory unit and the processor selects the first, second and third gains from the memory unit as a function of the generator frequency and the first, second and third amplitude signals, respectively.

11. The apparatus of claim 7 wherein the gain is determined during a commissioning procedure using a closed loop current regulating controller and the apparatus is used with an open loop controller after the commissioning procedure.

12. A method to be used with a PWM generator which receives first, second and third command voltages from a controller and uses the command voltages to generate associated first, second and third terminal voltages at, and first, second and third currents through, motor terminals, the method for substantially eliminating turn-on delay distortions in the terminal voltages and associated current by modifying the command voltages, the method comprising the steps of:

sensing the first, second and third terminal currents and providing an first, second and third amplitude signals indicative of the first, second and third current amplitudes;

comparing the first, second and third amplitude signals to upper and lower limit values which define a current range to determine when the first, second and third amplitude signals are within the range; and altering the first command voltage as a function of the first terminal current when the first amplitude signal is within the current range, altering the second command voltage as a function of the second terminal current when the second amplitude signal is within the current range and altering the third command voltage as a function of the third terminal current when the third amplitude signal is within the current range.

13. The method of claim 12 wherein the step of altering includes the steps of mathematically combining a first correction voltage with the first command voltage, mathematically combining a second correction voltage with the second command voltage and mathematically combining a third correction voltage with the third command voltage.

14. The method of claim 13 wherein the steps of mathematically combining include adding.

15. The method of claim 14 wherein a PWM inverter is controlled by the generator to generate the first, second and third terminal voltages, the PWM generator operates at a PWM frequency, the generator introduces dead times into terminal voltages, the inverter includes a DC bus having a constant DC value, each of the upper and lower limit values corresponds to an upper or lower correction voltage threshold value and the upper and lower threshold values are determined by mathematically combining the PWM frequency, the dead time and the DC bus value.

16. The method of claim 15 wherein the upper threshold value is determined by multiplying the PWM frequency, the dead time and the DC bus value and the lower threshold value is the negative of the upper threshold value.

17. The method of claim 16 wherein the step of altering includes, when the first amplitude signal is greater than the upper limit value, setting the first correction voltage equal to the upper threshold value and when the first amplitude signal is less than the lower threshold value, setting the first correction voltage equal to the lower threshold value, when the second amplitude signal is greater than the upper limit value, setting the second correction voltage equal to the upper threshold value and when the second amplitude signal is less than the lower threshold value, setting the second correction voltage equal to the lower threshold value and when the third amplitude signal is greater than the upper limit value, setting the third correction voltage equal to the upper threshold value and when the third amplitude signal is less than the lower threshold value, setting the third correction voltage equal to the lower threshold value.

18. The method of claim 17 further including the steps of, modifying the first, second and third amplitude signals as a function of first, second and third gains and providing the modified amplitude signals as the amplitude signals for comparison to the upper and lower limit values, respectively.

19. The method of claim 18 wherein the first, second and third gains are variable and controllable.

20. The method of claim 19 wherein the step of modifying the first, second and third amplitude signals includes multiplying the first, second and third amplitude signals by the first, second and third gains, respectively.

21. The method of claim 20 for use with a memory unit and a processor which can access the unit, the gains are dependent on the generator frequency and the amplitude signals, a plurality of gains are correlated with different generator frequencies and amplitude signals and stored in the memory unit and the method further includes the step of, selecting the first, second and third gains from the memory unit as a function of the generator frequency and the first, second and third amplitude signals, respectively.

22. A method for tuning a turn-on delay compensator using a closed loop current controller during a commissioning procedure to essentially eliminate turn-on delay distortions in first, second and third terminal voltages at motor terminals during subsequent control using an open loop controller, the closed loop controller provides both d and q-axis voltages and associated command voltages for controlling a PWM generator and provides three phase current feedback signals corresponding to the three phase terminal voltages, the compensator receives the feedback currents, adjusts the currents using a compensator gain and generates correction voltages to be added to the command voltages by comparing the adjusted amplitudes to upper and lower limit values, when an adjusted amplitude exceeds the upper limit value, the compensator sets the correction voltage equal to an upper threshold value, when an adjusted amplitude is less than the lower limit value, the compensator sets the correction voltage equal to a lower threshold value and when the adjusted amplitude is between the upper and lower limit values, the compensator sets the correction voltage equal to an amplitude which is between the upper and lower threshold values and which is dependent on the adjusted amplitude, the compensator tunable by adjusting a compensator gain, the method comprising the steps of:

(a) receiving first, second and third feedback currents and providing first, second and third amplitude signals indicative of the first, second and third current amplitudes;

(b) mathematically combining the first, second and third amplitude signals and the gain to provide first, second and third adjusted amplitudes;

(c) monitoring the d-axis voltage, when the d-axis voltage exhibits minimum distortion, skipping to step f;

(d) modifying the variable gain;

(e) repeating steps a through d; and (f) storing the gain as a tuned gain for the compensator.

23. The method of claim 22 wherein the generator operates at a PWM frequency, the gain is frequency dependent, the controller includes a memory unit and the method further includes the steps of setting the PWM frequency to a first value and performing steps a through f at the first frequency, correlating the first frequency with the identified gain, storing the gain and frequency in the memory unit and then repeating the entire method using one or more other frequencies until a frequency gain table is stored in the memory unit.

24. The method of claim 22 wherein the generator drives a PWM inverter which provides the terminal voltages, the generator introduces dead times into terminal voltages, the inverter includes a DC bus having a constant DC value and the upper and lower threshold values are determined by multiplying the PWM frequency, the dead time and the DC bus value.

25. The method of claim 24 wherein there is a linear relationship between the adjusted amplitude and the correction voltage between the upper and lower threshold values.

26. The method of claim 22 wherein the gain for each motor phase is independently modified.

* * * * *